United States Patent
Srivastava et al.

(10) Patent No.: US 11,157,702 B2
(45) Date of Patent: Oct. 26, 2021

(54) UTILIZING VARYING COORDINATES RELATED TO A TARGET EVENT TO PROVIDE CONTEXTUAL OUTPUTS

(71) Applicant: International Business Machines Corporation, Armonk, NY (US)

(72) Inventors: Anurag Srivastava, Pune (IN); Abhijit Singh, Bangalore (IN); Manoj Kumar Goyal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 16/293,779

(22) Filed: Mar. 6, 2019

(65) Prior Publication Data
US 2020/0285701 A1    Sep. 10, 2020

(51) Int. Cl.
*G06F 40/30* (2020.01)
*G06Q 30/06* (2012.01)
*G06Q 50/00* (2012.01)

(52) U.S. Cl.
CPC ......... *G06F 40/30* (2020.01); *G06Q 30/0631* (2013.01); *G06Q 50/01* (2013.01)

(58) Field of Classification Search
CPC ..... G06F 40/30; G06Q 30/0631; G06Q 50/01
See application file for complete search history.

(56) References Cited

U.S. PATENT DOCUMENTS

| | | | | |
|---|---|---|---|---|
| 2010/0318485 A1* | 12/2010 | Harada | .................. | G06Q 30/02 706/46 |
| 2012/0197754 A1* | 8/2012 | Kalin | ................. | G06Q 30/0633 705/26.8 |
| 2013/0083999 A1* | 4/2013 | Bhardwaj | ......... | G06F 16/24578 382/165 |
| 2013/0311322 A1* | 11/2013 | Potter | .................... | G06Q 50/12 705/26.7 |
| 2013/0346208 A1* | 12/2013 | Bouret | .................. | H04W 76/14 705/14.64 |
| 2014/0214494 A1* | 7/2014 | Jadhav | ............... | G06Q 10/0637 705/7.36 |
| 2014/0224867 A1* | 8/2014 | Werner | .................. | H04W 4/80 235/375 |
| 2014/0229552 A1* | 8/2014 | Ranganath | ............. | G06Q 50/01 709/206 |

(Continued)

FOREIGN PATENT DOCUMENTS

WO    2017042644 A1    3/2017

*Primary Examiner* — Daniel C Washburn
*Assistant Examiner* — Oluwadamilola M Ogunbiyi
(74) *Attorney, Agent, or Firm* — Cantor Colburn LLP; Diana Roberts Gerhardt

(57) ABSTRACT

A computer-implemented method for providing contextual outputs based on varying coordinates related to a target event is provided. The method is implemented by a processor. The processor receives the target event based on a user input and the varying coordinates. The processor then executes a semantic analysis and relationships building operation on the varying coordinates and the target event to generate proposals and provides the contextual outputs based on the proposals. Note that the semantic analysis and relationships building operation reduces recommendation errors by and increases a computing efficiency of the processor with regard to providing the contextual outputs.

17 Claims, 5 Drawing Sheets

(56) References Cited

U.S. PATENT DOCUMENTS

| | | | |
|---|---|---|---|
| 2014/0316829 A1 | 10/2014 | Bumbernick | |
| 2015/0106367 A1* | 4/2015 | Cook | G06F 16/24578 |
| | | | 707/732 |
| 2015/0118663 A1* | 4/2015 | Levy | G09B 5/02 |
| | | | 434/236 |
| 2016/0086249 A1* | 3/2016 | Zamer | G06Q 30/0639 |
| | | | 705/26.7 |
| 2016/0109954 A1* | 4/2016 | Harris | G06K 9/00671 |
| | | | 345/156 |
| 2016/0125502 A1* | 5/2016 | Byron | G06Q 10/025 |
| | | | 705/6 |
| 2016/0162456 A1* | 6/2016 | Munro | G06F 16/367 |
| | | | 704/9 |
| 2017/0147965 A1 | 5/2017 | Bender et al. | |
| 2018/0082348 A1* | 3/2018 | Banerjee | G06Q 30/0631 |
| 2018/0101576 A1* | 4/2018 | Lin | G06F 16/9535 |
| 2018/0197227 A1* | 7/2018 | McHale | H04W 4/024 |
| 2018/0268253 A1* | 9/2018 | Hoffman | G06K 9/6218 |
| 2019/0050494 A1* | 2/2019 | Rao | G06F 16/7867 |
| 2019/0114688 A1* | 4/2019 | Ko | G06Q 30/02 |
| 2019/0114689 A1* | 4/2019 | Wang | G06Q 30/0224 |
| 2019/0163985 A1* | 5/2019 | Wang | G06K 9/00778 |
| 2019/0190874 A1* | 6/2019 | Petrosian | G06F 16/29 |
| 2019/0325080 A1* | 10/2019 | Natarajan | G06F 3/0237 |
| 2020/0019873 A1* | 1/2020 | Miller | G06Q 30/0282 |
| 2020/0250235 A1* | 8/2020 | Abhyankar | G06F 16/907 |
| 2020/0389438 A1* | 12/2020 | Chakraborty | G06F 21/6263 |
| 2021/0173884 A1* | 6/2021 | Zhang | G06N 3/08 |

* cited by examiner

UTILIZING VARYING COORDINATES RELATED TO A TARGET EVENT TO PROVIDE CONTEXTUAL OUTPUTS

BACKGROUND

The disclosure relates generally to event planning, and more specifically, to utilizing varying coordinates related to a target event to provide contextual outputs.

In general, users plan for events in many different ways, such as utilizing event planning tools, reading online blogs, talking to friends, etc. Contemporary computing systems enable a user to set a target event, which can be exposed to contacts of that user. Contemporary computing systems also expose certain information, with respect to the target event, to commercial vendors so that special offers can be delivered to the user. However, contemporary computing systems are unable to determine a context of the target event and utilize external parameters that may affect details of the target event.

SUMMARY

According to one or more embodiments, a computer-implemented method for providing contextual outputs based on varying coordinates related to a target event is provided. The method is implemented by a processor. The processor receives the target event based on a user input and the varying coordinates. The processor then executes a semantic analysis and relationships building operation on the varying coordinates and the target event to generate proposals and provides the contextual outputs based on the proposals. Note that the semantic analysis and relationships building operation reduces recommendation errors by and increases a computing efficiency of the processor with regard to providing the contextual outputs.

According to one or more embodiments, the above method can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
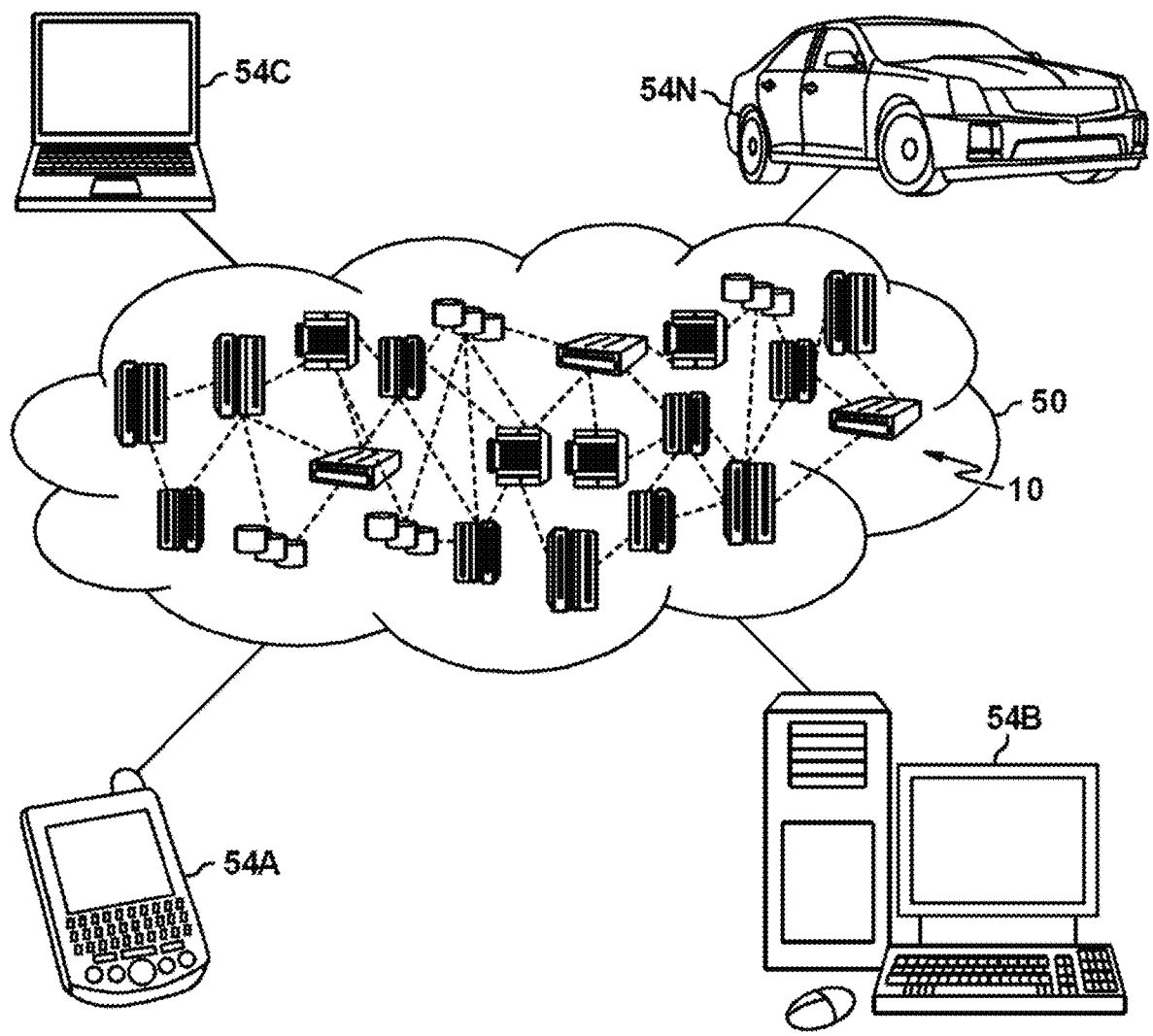
FIG. 1 depicts a cloud computing environment in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, because contemporary computing systems are unable to determine a context of the target event and utilize external parameters that may affect details of the target event, contemporary computing systems have limited abilities to engage users with respect to planning for the target event.

Turning now to an overview of the aspects of the invention, one or more embodiments of the invention address the above-described shortcomings of the prior art by providing a system that utilizes varying coordinates related to a target event to provide contextual outputs. In this regard, embodiments disclosed herein may include a system, method, and/or computer program product (collectively referred to herein as a system) that creates, receives, and/or manages the target event based on varying coordinates, such as history data and event data, that affect event planning to provide automatic contextual outputs (e.g., contextual recommendations and/or offers) to further enjoyment by a user of the target event. Note that a user can be a person for whom the target event is created and to whom contextual outputs are delivered. Further note that varying coordinates can also include, but is not limited to, user inventory, user purchase history, user search history, user interests, user budgets, destination weather predictions, destination attractions, destination activity factors, market trends, and social media activity.

Technical effects and benefits of the system include, but is not limited to, computing efficiency respective to continuous observations of external events having the potential to affect details of the target event and automatic contextual outputs. Thus, embodiments described herein are necessarily rooted in the system (and processors therein) to perform proactive operations to overcome problems specifically arising in the realm of event planning (e.g., these problems include reducing recommendation errors by contemporary computing systems, resulting in wasted processing power), thereby increasing computing efficiency with regard to contextual outputs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
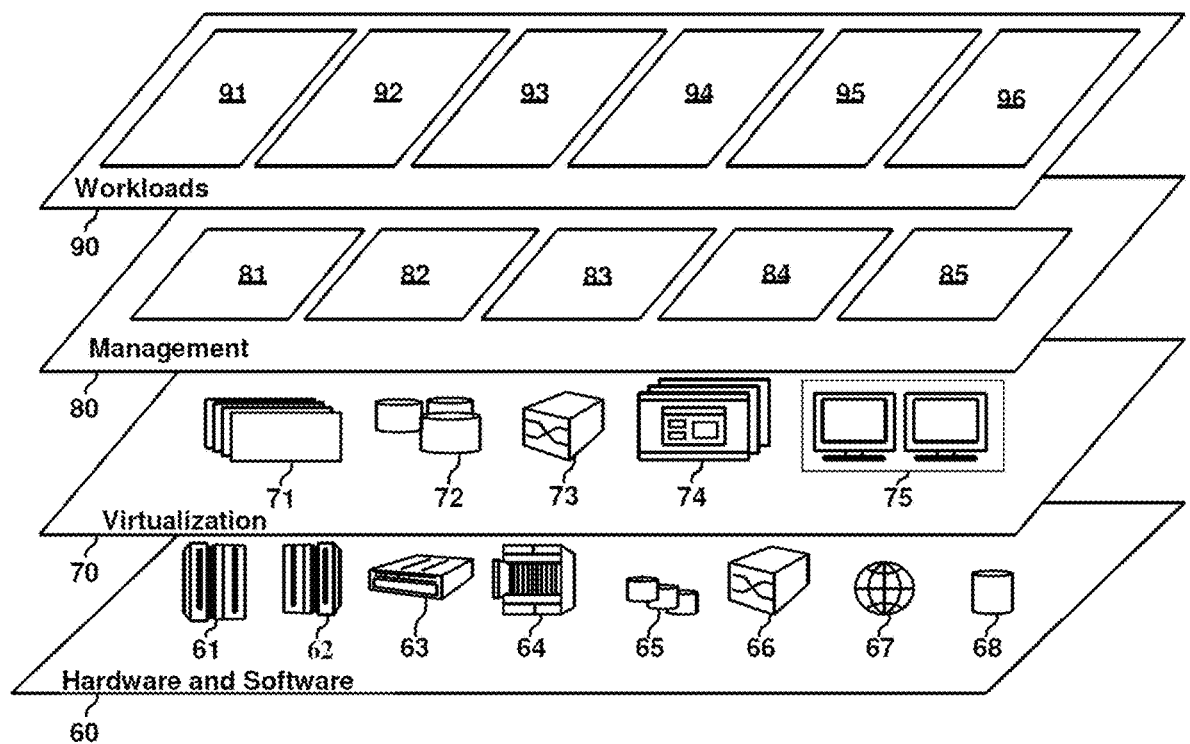
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and continuous observations and automatic contextual outputs 96.

Figure 3:
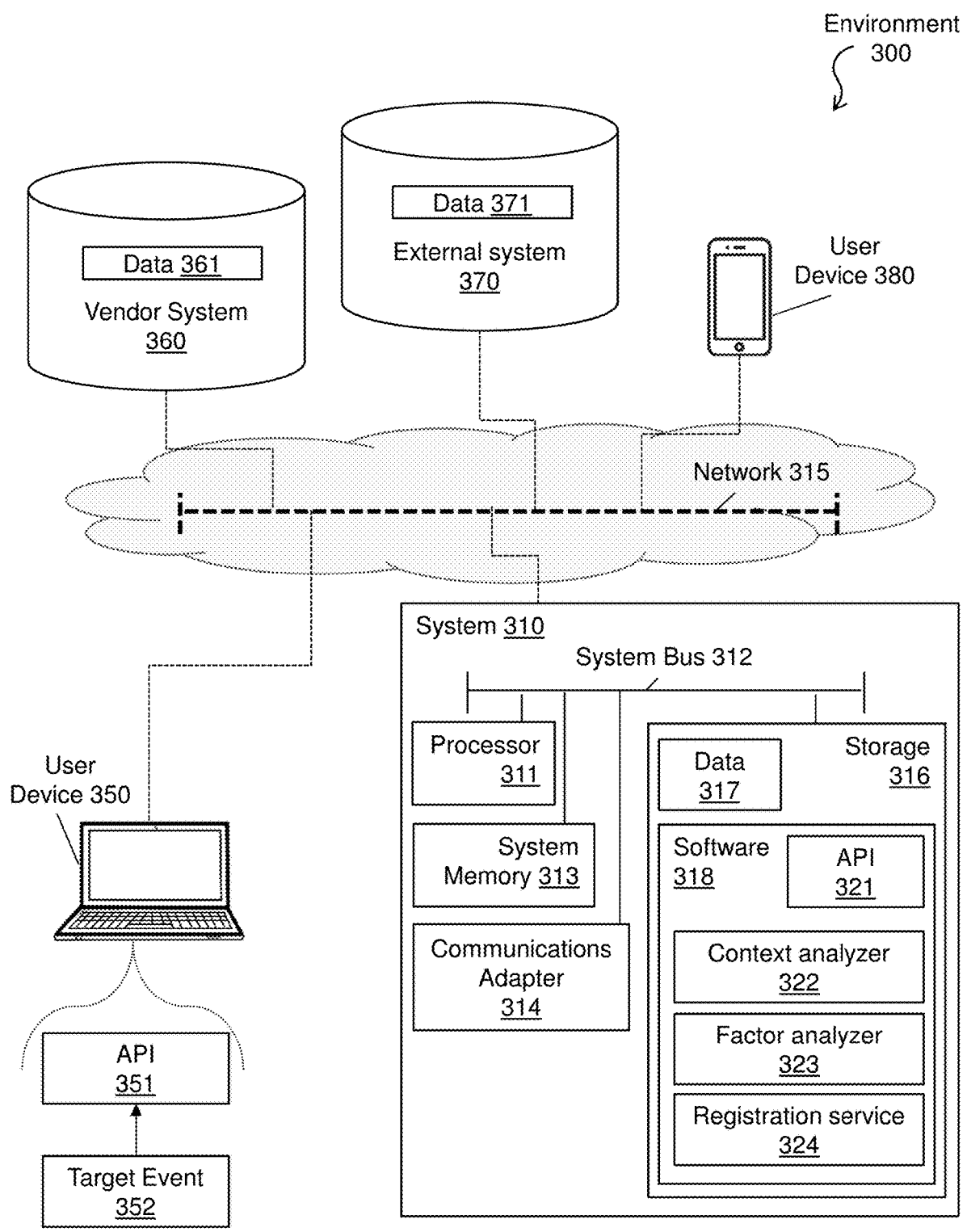
FIG. 3 depicts an environment in accordance with one or more embodiments.

Turning now to FIG. 3, where an environment 300 is depicted in accordance with one or more embodiments. The environment 300 includes a system 310, which can be an electronic, computer framework including and/or employing any number and combination of the computing device and networks utilizing various communication technologies, as described herein. The environment 300 and/or the system 310 can be easily scalable, extensible, and modular, with the ability to change to different services or reconfigure some features independently of others. Note that while single items and elements are depicted for the environment 300 and/or the system 310, these are representative of one or more of that item and element and are not to be construed as limiting.

The system 310 for implementing the teachings herein is shown in according to one or more embodiments of the invention. In this embodiment, the system 310 has a processor 311, which can include one or more central processing units (CPUs). The processor 311, also referred to as a processing circuit, microprocessor, computing unit, is coupled via a system bus 312 to a system memory 313 and various other components. The system memory 313 includes read-only memory (ROM) and random access memory (RAM). The system 310 of FIG. 3 includes one or more adapters (e.g., storage controllers, network adapters, graphics adapters, etc.) that interconnect and support communications between the processor 311, the system memory 313, the storage 316, and other components of the system 310 (e.g., other components of the environment 300). As shown, the system 310 includes a communications adapter 314 interconnects the system 312 with a network 315 enabling the system 310 to communicate with other systems, devices, data, and software (e.g., other components of the environment 300).

The system 310 of FIG. 3 includes storage 316, which is an example of a tangible storage medium readable executable by the processor 311. The storage 316 stores data 317 and software 318. The data 317 includes a set of values of qualitative or quantitative variables organized in various data structures to support and be used by operations of the software 318. The software 318 is stored as instructions for execution on the system 310 by the processor 311 (e.g., to perform a process, such as the operational schematics 400 and 500 of FIGS. 4-5).

In one or more embodiments of the present invention, the software 318 includes an application programming interface (API) 321, a context analyzer 322, a factor analyzer 323, and a registration service 324. The API 321 is a set of subroutine definitions, protocols, and tools, along with defined methods of communication, for the software to communicate with web-based systems, operating systems, database systems, computer hardware, and/or software libraries of components of the environment 300. The context analyzer 322 includes an Internet of things (JOT) enabled service to track items of a user. The factor analyzer 323 for analyzing data from news sites and social networking sites to determine events that could impact a target event. The registration service 324 derives relationships between users, target events, vendors, and other constituents.

The environment of FIG. 3 also includes a user device 350 (with an API 351 and a target event 352 therein), a vendor system 360 (with data 361 therein), an external system 370 (with data 371 therein), and a user device 380. All information (e.g., metadata from the user devices 350 and 380 and external factors of the data 361 and 371) can be considered coordinates that are received and stored by the system 310 as data 317. These coordinates can be considered varying coordinates due to the fact that the underlying information is continuously changing and updating (e.g., metadata may include a hotel change or external factors may include a forming weather storm). In turn, the system 310 processes varying coordinates, which comprise this data 317 (as it changes and updates), related to the target event 352 to provide contextual outputs. By way of example, a vendor (who owns the vendor system 360) publishes offers as contextual outputs through the system 310 to the user in the context of the target event 352, based on any proposals and/or metadata that the vendor is exposed thereto by the software 318 of the system 310.

The user devices 350 and 380 are generally any consumer computing device, whether in a home, an office, or a public setting, such as a tablet computer, a mobile phone, a smart phone, a smartwatch, a desktop computer, a laptop computer, and the like. The API 351 can be software through which the target event 352 is detected and provided to the system 310. The target event 352 can be any travel itinerary, airline/bus/train ticket, car rental, hotel room, concert/sports ticket, theatre admission, park admission and the like that a user creates, purchases, or reserves. The API 351 can create and provide metadata about the target event 352, such as times, dates, locations, pricing, a relation to the user, etc. This metadata can be used by the system 310 to identify the external factors of the data 361 and 371 that may have an impact on the target event 352. Note that user device 380 can have a similar API for providing similar information.

The vendor system 360 and the external system 370 are generally any server or server environment that supports one or more applications. In accordance with one or more embodiments, the vendor system 360 can be representative of computer systems of a travel agency providing destination attractions and activity factors, along with transportation, hotel, and reservation information, as the data 361. The vendor system 360 can also be representative of computer systems of an apparel company, department store, or warehouse store providing user inventory, user purchase history, user search history, and user interests, as the data 361. Further, the external system 370 can be representative of computer systems of a social media providing social media activity and calendar information, along with user connections and interest, as the data 371. The external system 370 can also be representative of computer systems of a weather agency providing destination weather predictions, airline weather conditions, and the like as data 371. In accordance with one or more embodiments, the user devices 350 and 380, the vendor system 360, and/or the external system 370 can also provide data market trends, history data, and event data that affect planning of the target event 352.

In one or more embodiments of the present invention, the operations of the software 318 and the data 317 can be implemented on and/or through the network 315 by the system 310 to provide internal iterations of the software 318 and the data 317 as a platform as a service, a software as a service, and/or infrastructure as a service (e.g., as a web application in a distributed system). In this regard, the factor analyzer 323 and registration service 324 can be cloud-based services to the user devices 350 and 380, while the context analyzer 322 can be installed as an application (e.g., under the API 351) in the user device 350 to procure the target event 352 and track items of a user.

Thus, as configured in FIG. 3, the operations of the software 318 and the data 317 (e.g., the system 310) are necessarily rooted in the computational ability of the processor 311 to overcome and address the herein-described shortcomings of the contemporary computing system. In this regard, the software zz08 and the data zz09 improve computational operations of the processor 311 and/or the server zz51 of the system 310 by reducing recommendation errors by contemporary computing systems that cause wasted processing power (thereby increasing computing efficiency with regard to contextual recommendations of the system 310).

Figure 4:
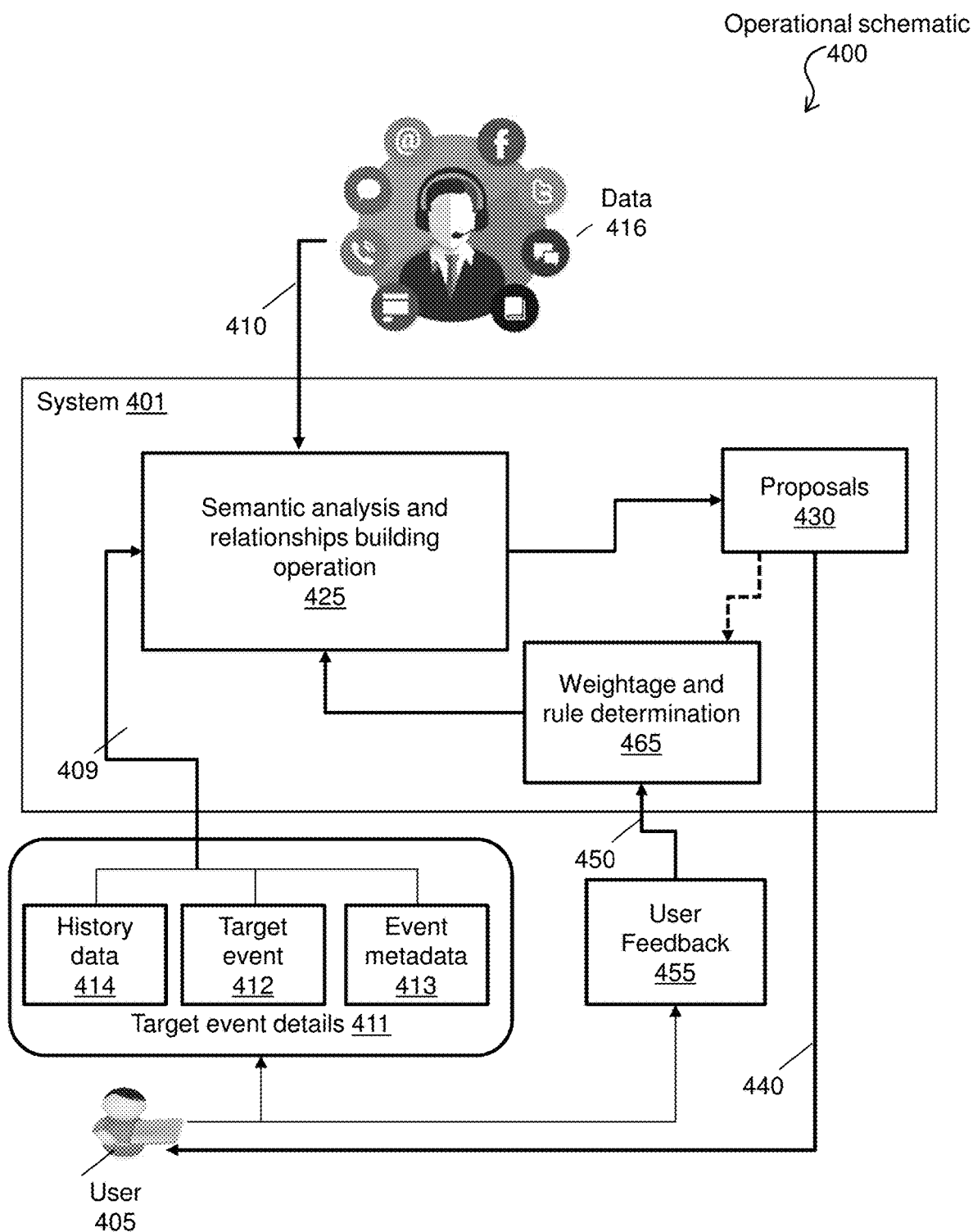
FIG. 4 depicts an operational schematic of a system in accordance with one or more embodiments.

FIG. 4 depicts an operational schematic 400 of a system 401 that provides automatic contextual outputs to further enjoyment by a user 405 in accordance with one or more embodiments. For instance, the system 401 is an example of the system 310 of FIG. 3, and the operational schematic 400 is an example of the environment 300 of FIG. 3 creating, receiving, and/or managing the target event 352 of FIG. 3 based on varying coordinates that affect event planning to provide automatic contextual outputs to further enjoyment of the target event 352.

In the operational schematic 400, as shown by arrows 409 and 410, the system 401 (e.g., the processor 311 of FIG. 3) receives target event details 411 and varying coordinates. The target event details 411 can include the target event 412 itself. The target event 412 can be identified based on a user input, such as selection of a hotel reservation on a hotel website, by an API of a user device being used by the user 405 (e.g., the API 351). The varying coordinates of the target event details 411 can include event metadata 413 and history data 414 (e.g., user search history). With respect to arrow 410, the system 401 (e.g., the processor 311 of FIG. 3) receives varying coordinates, as data 416, which is sourced from any external system in communication with the system 401 (e.g., the vendor system 360 and the external system 370). The receiving of the target event details 411 and the data 416 can be a result of any pull or push technology by the system 401.

After receiving of the target event details 411 and the data 416, the system 401 executes (block 425) a semantic analysis and relationships building operation on the varying coordinates and the target event 412 to generate one or more proposals 430. The semantic analysis and relationships building operation of the system 401 reduces recommendation errors (by using the target event details 411 and the data 416) and increases a computing efficiency (by generating proposals 430 from the target event details 411 and the data 416).

Figure 5:
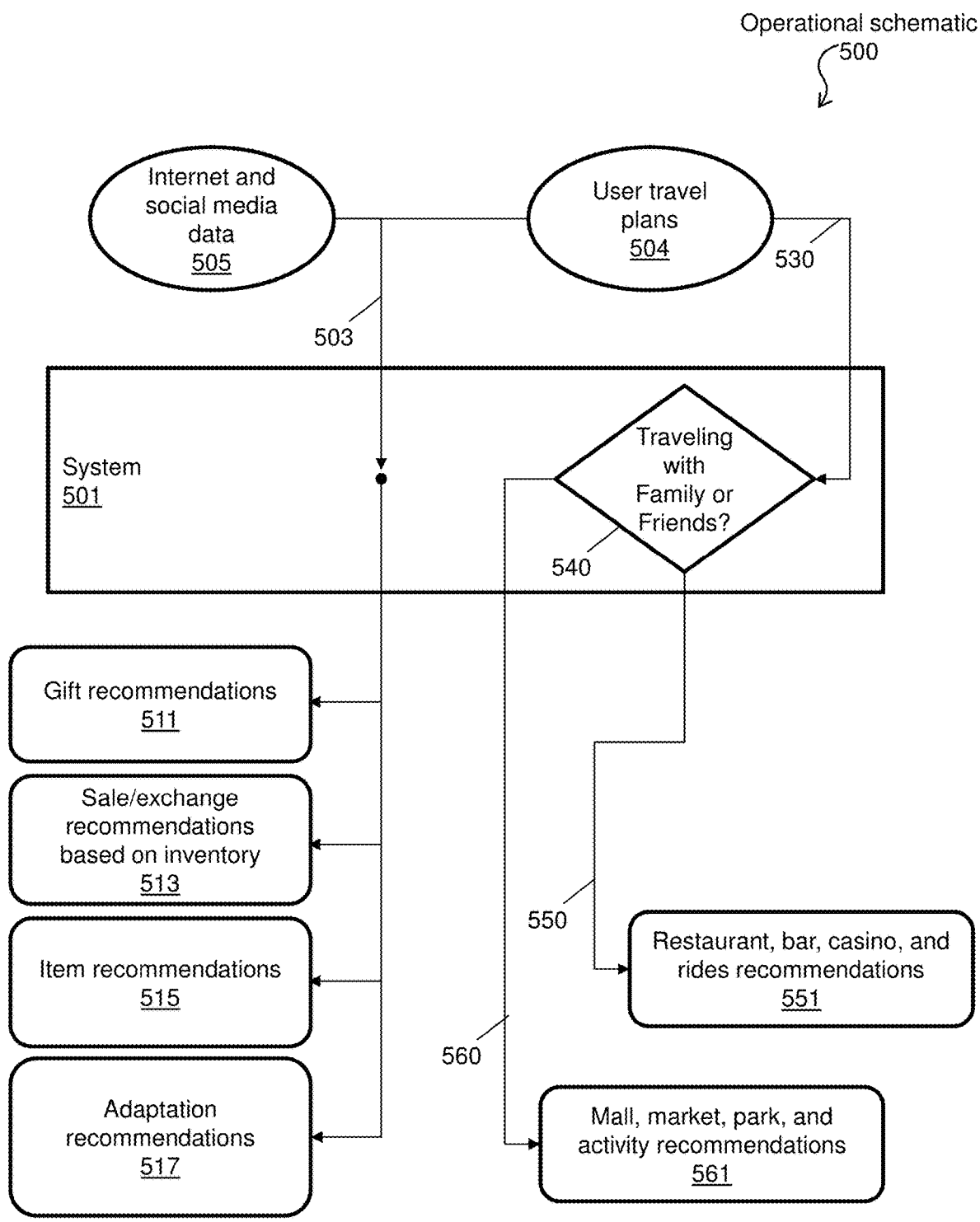
FIG. 5 depicts an operational schematic of a system in accordance with one or more embodiments.

Turning to FIG. 5, an operational schematic 500 of a system 501 that generates the one or more proposals (e.g., the proposals 430 of FIG. 4) is depicted in accordance with one or more embodiments. In the operational schematic 500, as shown by arrow 503, the system 501 receives user travel plans 504 and internet and social media data 505. The system 501, in turn, executes a semantic analysis and relationships building operation that provides proposals, such as gift recommendations 511, sale/exchange recommendations based on inventory 513, item recommendations 515 (needed at the destination), and adaptation recommendations 517 (includes detail changes in lieu of cancelations, such as flights to alternative destinations, alternative hotel bookings due to current hotel being unavailable, etc.). Note that, at decision block 540, the system 501 also utilizes the travel plans 504 (as shown by arrow 530) to determine whether the user is traveling with family or friends. As shown by arrow 550, if the user is traveling with friends, the system 501 provides proposals 551 regarding restaurant, bar, casino, and rides recommendations. As shown by arrow 560, if the user is traveling with family, the system 501 provides proposals 561 regarding mall, market, park, and activity recommendations.

For example, the system 401 (e.g., the context analyzer 322 of FIG. 3) tracks items of the user 405 through the history data 414 (e.g., clothing purchase history including colors) to determine if any apparel is needed for the target event 412 (e.g., the hotel reservation). The system 401 (e.g., the factor analyzer 323 of FIG. 3) analyzes the data 416 from news sites and social networking sites to determine events (e.g., a St. Patrick's Day parade and road closures) that could impact the target event 412. The system 401 (e.g., the registration service 324 of FIG. 3) derives relationships between the user 405, the target event 412, constituents, and vendors. Further, the system generates one or more proposals 430, such as green apparel for the St. Patrick's Day parade, a late check out to avoid traffic due to road closures for the St. Patrick's Day parade, and a suggestion to meet friends at a local Irish pub who have a similar hotel reservation.

As shown by arrow 440, the system 401 provides contextual outputs in accordance with the one or more proposals 430. That is, the system 401 can select from the one or more proposals 430 to be the contextual outputs, based on a default value (e.g., an integer from 1-10) and/or available vendor offers (e.g., upcoming sale on great apparel).

As shown by arrow 450, the system 401 can receive user feedback 455 in response to the one or more proposals. In turn, the system 401 executes a weightage and rule determination 465 on the one or more proposals 430 and the user feedback 455. The system 401 can also execute continuous observations of external events having potential to affect the target event details 411 and the contextual outputs, along with provide the continuous observations and/or additional event details to the semantic analysis and relationships building operation 425 to generate the one or more enhanced proposals.

In accordance with one or more embodiments of the system described herein (with respect to an example of understanding a user context), a user can plan a vacation to a high-altitude place where snow fall is expected. The system can suggest to buy things he/she needs at that high-altitude. The system can also suggest which things he/she can sell or/and exchange (e.g., based on his inventory/past shopping details) to get new items. And, based on a past shopping history, the system can show things within a budget (e.g., within which user generally buys). For example, if a snow jacket is needed for the upcoming travel and the user bought a Denim jacket within the past year, the system can provide exchange offers/proposals on Denim jacket for the snow jacket.

In accordance with one or more embodiments of the system described herein (with respect to an example of external events having a potential to affect planning), a user can plan a vacation to a city by completing all necessary bookings. In turn, the system continuously monitors news/events of that city, while also capturing an impact of those news/events. The system can notify the user of that impact so that the user can cancel or modify the vacation. For example, because any unpredictable riots, natural disasters, or any critical news of the city can impact user's travel, if a user's travel dates are falling within a relative time period, then the system can provide modification proposals (e.g., instead of a user cancellation). The system can also provide proposals for favorable places nearby to the city or events that the user may find interesting. The system can also provide proposals with respect to booking an alternate hotel, which is not in the vicinity of the captured impact.

In accordance with one or more embodiments of the system described herein (with respect to an example of understanding a user context), a user can plan a vacation to a city by completing all necessary bookings. In turn, the system continuously monitors the social media of the user, with respect to that user's family and friends in the city. For example, if the system identifies that one of user's friends in the city is going to celebrate his wedding anniversary during user's travel, the system can provide an anniversary gift proposal. Further, as the system is also aware the kind of products, food, and restaurant the user's friend likes (via the social media), the system can provide a gift proposal with respect to a voucher at the user's friend's favorite restaurant or a favorite mall. Furthermore, if the user already has an unused gift voucher, the system can suggest that the user give that gift card to the friend In accordance with one or more embodiments of the system described herein (with respect to an example of understanding a user context), the system can provide proposals of an attraction/interest based on with whom the user is traveling. The system can also be aware of user check-ins. In turn, the system can identify which places the user have visited and with whom (provided user has shared those details on social media). If user's upcoming travel is with friends, the system provide proposals of happening places, pubs, Bars, Discs, Casinos, adventure rides etc. in a destination city. If the user is traveling with family and based on the user's previous check-ins in other cities on a family trip, the system can show points of attraction accordingly.

Herein, references are made to various things the disclosed system can do, according to embodiments of the present invention. It should be understood that in the present disclosure those references are meant to indicate that when the system does such things, the system may do them based on information the system obtains that is related to the respective things the system does, as is indicated in the respective contexts disclosed herein. For example, the disclosure states herein that a user can plan a vacation to a high-altitude place where snow fall is expected and states that the system can suggest to buy things the user needs in that situation. The statements in this context herein, for example, are intended to indicate that the system does what it does, i.e., makes the suggestion(s), based on information the system obtains that is related to what the system does, as indicated in the stated context, i.e., in the context of this stated example, information about conditions at the high-altitude place, e.g., weather, altitude, etc. It should be understood for this stated example that the disclosure indicates the information may also include information that the system obtains about the user's plans at that place. It should also be understood, as previously indicated herein, that the system may obtain the information from sources the system may access via a network or in the user's device. Also, it should be understood that the system may obtain such information automatically or otherwise.

It should be understood from the disclosure herein that disclosed embodiments of the invention enable a user to create events, such as via a software application or module of an application, which may be in the user's mobile device or elsewhere, and to store the events, such as in the mobile device or in networked storage. Along with storing an association of the events to the user, the application or module also stores meta data about the event, including external factors that may have impact on the event. The meta data is also exposed to the vendors so that they can target offers related to the metadata. A user context analyzer, e.g., a software application or module of an application in the user's mobile device or elsewhere, provides an IOT enabled service that keeps track of household items that a user has. An external factor analyzer, e.g., which may include a cloud-based application or module, analyzes data, such as from news sites and social networking sites, to understand what kind of events could have some impact on the user's events. A registration service registers vendors and users and brings together the above described elements. Relationships between a user and a user event are derived through the registration service.

It should be understood from the disclosure herein that disclosed embodiments of the invention enable a system to understand a user's context in terms of his/her current inventory related to an event the user has planned and enables the system to present offers to buy/sell or exchange the user's inventory list items by analyzing market, user's budget, past shopping interest, social media, which is enabled at least partly by observation by the system, continuous or otherwise, of external events having potential to affect planning, thus creating further business opportunity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing contextual outputs based on varying coordinates related to a target event, comprising:
    receiving, by a processor, the target event based on an input from a user;
    receiving, by the processor, the varying coordinates; and
    executing, by the processor, a semantic analysis and relationships building operation on the varying coordinates and the target event to generate one or more proposals; and
    providing, by the processor, the contextual outputs in accordance with the one or more proposals,
    wherein the semantic analysis and relationships building operation reduces recommendation errors by and increases a computing efficiency of the processor with regard to providing the contextual outputs, and
    wherein the one or more proposals include a gift recommendation for a friend of the user based on a proximity of the friend to the varying coordinates and a social media profile of the friend.

2. The computer-implemented method of claim 1, further comprising:
    executing continuous observations of external events having potential to affect details of the target event and the contextual outputs; and
    providing the continuous observations to a subsequent semantic analysis and relationships building operation to generate the one or more proposals.

3. The computer-implemented method of claim 1, further comprising:
    receiving user feedback in response to the one or more proposals; and
    executing a weightage and rule determination on the one or more proposals and the user feedback to determine additional event details; and
    generating one or more enhanced proposals based on inputting the additional event details to a subsequent semantic analysis and relationships building operation.

4. The computer-implemented method of claim 3, wherein providing the contextual outputs in accordance with the one or more proposals comprises selecting at least one of the one or more enhanced proposals based on whether a user is traveling with family or friends.

5. The computer-implemented method of claim 1, wherein the varying coordinates comprise history data and event data that affect planning of the target event.

6. The computer-implemented method of claim 1, wherein the varying coordinates comprise user inventory, user purchase history, user search history, user interests, user budgets, destination weather predictions, destination attractions, destination activity factors, market trends, and social media activity.

7. A computer program product for providing contextual outputs based on varying coordinates related to a target event, the computer program product comprising a computer readable storage medium having program instructions embodied therewith, the program instructions executable by a processor to cause:
    receiving, by the processor, the target event based on an input from a user;
    receiving, by the processor, the varying coordinates; and
    executing, by the processor, a semantic analysis and relationships building operation on the varying coordinates and the target event to generate one or more proposals; and
    providing, by the processor, the contextual outputs in accordance with the one or more proposals,
    wherein the semantic analysis and relationships building operation reduces recommendation errors by and increases a computing efficiency of the processor with regard to providing the contextual outputs, and
    wherein the one or more proposals include a gift recommendation for a friend of the user based on a proximity of the friend to the varying coordinates and a social media profile of the friend.

8. The computer program product of claim 7, wherein the program instructions are further executable by the processor to cause:
    executing continuous observations of external events having potential to affect details of the target event and the contextual outputs; and
    providing the continuous observations to a subsequent semantic analysis and relationships building operation to generate the one or more enhanced proposals.

9. The computer program product of claim 7, wherein the program instructions are further executable by the processor to cause:
    receiving user feedback in response to the one or more proposals; and
    executing a weightage and rule determination on the one or more proposals and the user feedback to determine additional event details; and
    generating one or more enhanced proposals based on inputting the additional event details to a subsequent semantic analysis and relationships building operation.

10. The computer program product of claim 9, wherein providing the contextual outputs in accordance with the one or more proposals comprises selecting at least one of the one or more enhanced proposals based on whether a user is traveling with family or friends.

11. The computer program product of claim 7, wherein the varying coordinates comprise history data and event data that affect planning of the target event.

12. The computer program product of claim 7, wherein the varying coordinates comprise user inventory, user purchase history, user search history, user interests, user budgets, destination weather predictions, destination attractions, destination activity factors, market trends, and social media activity.

13. A system for providing contextual outputs based on varying coordinates related to a target event, the system comprising a processor and a memory storing program instructions thereon, the program instructions executable by a processor to cause the system to perform:
- receiving, by the processor, the target event based on an user input from a user;
- receiving, by the processor, the varying coordinates; and
- executing, by the processor, a semantic analysis and relationships building operation on the varying coordinates and the target event to generate one or more proposals; and
- providing, by the processor, the contextual outputs in accordance with the one or more proposals,
- wherein the semantic analysis and relationships building operation reduces recommendation errors by and increases a computing efficiency of the processor with regard to providing the contextual outputs, and
- wherein the one or more proposals include a gift recommendation for a friend of the user based on a proximity of the friend to the varying coordinates and a social media profile of the friend.

14. The system of claim 13, wherein the program instructions are further executable by the processor to cause the system to perform:
- executing continuous observations of external events having potential to affect details of the target event and the contextual outputs; and
- providing the continuous observations to a subsequent semantic analysis and relationships building operation to generate the one or more proposals.

15. The system of claim 13, wherein the program instructions are further executable by the processor to cause the system to perform:
- receiving user feedback in response to the one or more proposals; and
- executing a weightage and rule determination on the one or more proposals and the user feedback to determine additional event details; and
- generating one or more enhanced proposals based on inputting the additional event details to a subsequent semantic analysis and relationships building operation.

16. The system of claim 15, wherein providing the contextual outputs in accordance with the one or more proposals comprises selecting at least one of the one or more enhanced proposals based on whether a user is traveling with family or friends.

17. The system of claim 13 wherein the varying coordinates comprise history data and event data that affect planning of the target event.

* * * * *